US008643767B2

(12) United States Patent
Nagao

(10) Patent No.: US 8,643,767 B2
(45) Date of Patent: Feb. 4, 2014

(54) IMAGING DEVICE AND IMAGING METHOD

(75) Inventor: Seiji Nagao, Ebina (JP)

(73) Assignee: Ricoh Company, Ltd., Tokyo (JP)

(*) Notice: Subject to any disclaimer, the term of this patent is extended or adjusted under 35 U.S.C. 154(b) by 277 days.

(21) Appl. No.: 12/960,946

(22) Filed: Dec. 6, 2010

(65) Prior Publication Data

US 2011/0134311 A1 Jun. 9, 2011

(30) Foreign Application Priority Data

Dec. 7, 2009 (JP) ................................ 2009-277555

(51) Int. Cl.
*H04N 5/232* (2006.01)

(52) U.S. Cl.
USPC ............... 348/345; 396/79; 396/89; 396/121; 396/124; 396/139; 396/150; 396/151

(58) Field of Classification Search
USPC .............. 348/345; 396/79, 89, 121, 124, 139, 396/150, 151
See application file for complete search history.

(56) References Cited

U.S. PATENT DOCUMENTS

| 2005/0195317 A1* | 9/2005 | Myoga ............................ 348/370 |
| 2008/0106615 A1 | 5/2008 | Ahonen et al. |
| 2008/0284901 A1* | 11/2008 | Misawa .......................... 348/349 |
| 2009/0021600 A1 | 1/2009 | Watanabe |
| 2009/0040321 A1* | 2/2009 | Nakamura ................ 348/208.11 |
| 2009/0238549 A1* | 9/2009 | Kanayama ....................... 396/95 |

FOREIGN PATENT DOCUMENTS

| JP | 2008-79193 A | 4/2008 |
| JP | 2008-529322 | 7/2008 |
| JP | 2009-27298 | 2/2009 |

OTHER PUBLICATIONS

Office Action issued Aug. 27, 2013 in Japanese Patent Application No. 2009-277555.

* cited by examiner

*Primary Examiner* — Roberto Velez
*Assistant Examiner* — Yih-Sien Kao
(74) *Attorney, Agent, or Firm* — Oblon, Spivak, McClelland, Maier & Neustadt, L.L.P.

(57) ABSTRACT

An imaging device includes: an optical system which obtains an optical image of a photographic subject; an image sensor which converts the optical image to an electric signal; a digital signal processor which produces image data based on the electric signal; a display section which displays a photographic subject image expressed by the image data; and an operating section which performs a necessary setting regarding imaging, the digital signal processor including: an autofocus operation section which performs an autofocus operation based on data of an autofocus area set in the photographic subject image; a main area setting section which sets a main area in the photographic subject image; and a blurring operation section which performs a blurring operation on an area other than the main area in the photographic subject image, wherein the autofocus area is set automatically to overlap with at least a part of the main area.

13 Claims, 15 Drawing Sheets

DISPLAY FRAME 18a

MAIN AREA 18c    BLURRING AREA 18b

BLURRING AREA
(BLURRING OPERATION)
18b
20a
INTERMEDIATE AREA
(SLIGHT-BLURRING OPERATION) 18d
MAIN AREA
(AF OPERATION) 18c 18b
20a
18d
18c

IMAGING DEVICE AND IMAGING METHOD

The present application is based on and claims priority from Japanese patent application number 2009-277555, filed Dec. 7, 2009, the disclosure of which is hereby incorporated by reference herein in its entirety.

BACKGROUND

The present invention relates to an imaging device and an imaging method, which is used for an imaging processing mechanism of a digital camera in particular, and is applicable to mobile electronic devices such as a mobile phone, a PDA (personal digital assistant), and a toy that have an imaging device.

In recent years, digital cameras have been widely used. One of the features of a digital camera is that a picture is freely created by a user while imaging or after imaging. And as such a creation technique, "a miniature faking photography technique" is known, in which a landscape photograph that has been imaged normally is created as if a miniature scale model was imaged at a close range. In many cases where the above technique is executed, retouching software for image editing is used and some procedures are taken. And additionally, a packaged software that makes it easy to execute the miniature faking photography has also been disclosed.

Actual methods by using the retouching software are as follows.
1. Forming an image in which contrast and saturation are high by increasing contrast and saturation of a photograph. (Improving a hazy-like state of an image which is seen in many landscape photographs and the like.)
2. Setting the depth of field shallow, that is, setting an in-focus range narrow, in the case where the depth of field is deep, that is, a range of an in-focus distance is wide. (Blurring an area other than that of a main photographic subject to be out-of-focus.)

By the above methods, anyone can easily perform "the miniature faking photography technique" on imaged photographs.

In Japanese patent application publication number 2009-27298, and a published Japanese translation of PCT international publication for patent application 2008-529322, a technique is disclosed that obtains an image in which a background is blurred like a portrait photograph in such a manner that an AF (autofocus) area is determined, and a blurring operation is performed on an area other than the AF area. However, Japanese patent application publication number 2009-27298, and a published Japanese translation of PCT international publication for patent application 2008-529322 discloses that the blurring operation is performed, but do not relate to a miniature faking photography, and a blurring area is not specified.

However, performing an image processing operation by use of the above retouching software on a PC (personal computer) is a troublesome task for a user.

In the case of performing the miniature faking photography by performing the image processing operation on an image after imaging, an in-focus area which is in focus is not changed, because the in-focus area in the image after imaging has been determined.

That is, as to a processing software in the case of performing the miniature faking photography, a miniature faking photograph is obtained in such a manner that a main area to look like a miniature scale model is set by a user, and a blurring operation to blur an area other than the set main area as a blurring area to be out-of-focus is performed.

However, in the case where the in-focus area and the main area set by the user are different, if the miniature faking photography is performed on the image after imaging, there is a case where an area to look like the miniature scale model in the image is not in focus, and therefore there is a problem in that an effect of the miniature faking photography is not obtained precisely.

SUMMARY

An object of the present invention is to provide an imaging device and an imaging method which execute a miniature faking photography operation in which a setting of a blurring area where a blurring operation is performed is properly performed.

In order to achieve the object, the embodiments of the present invention provide: an imaging device comprising: an optical system which obtains an optical image of a photographic subject; an image sensor which converts the optical image to an electric signal; a digital signal processor which produces image data based on the electric signal; a display section which displays a photographic subject image expressed by the image data; and an operating section which performs a necessary setting regarding imaging, the digital signal processor including: an autofocus operation section which performs an autofocus operation based on data of an autofocus area set in the photographic subject image; a main area setting section which sets a main area in the photographic subject image; and a blurring operation section which performs a blurring operation on an area other than the main area in the photographic subject image, wherein the autofocus area is set automatically to overlap with at least a part of the main area.

In order to achieve the object, the embodiments of the present invention provide: an imaging method, comprising: a step of obtaining an optical image of a photographic subject; a step of converting the optical image to an electric signal; a step of producing image data based on the electric signal; a display step that displays a photographic subject image expressed by the image data; an autofocus operation step that performs an autofocus operation based on data of an autofocus area set in the photographic subject image; a main area setting step that sets a main area in the photographic subject image; and a blurring operation step that performs a blurring operation on an area other than the main area in the photographic subject image, wherein the autofocus area is set automatically to overlap with at least a part of the main area.

DETAILED DESCRIPTION OF THE PREFERRED EMBODIMENTS

Hereinafter, embodiments in the present invention will be explained with reference to the drawings.

Figure 1:
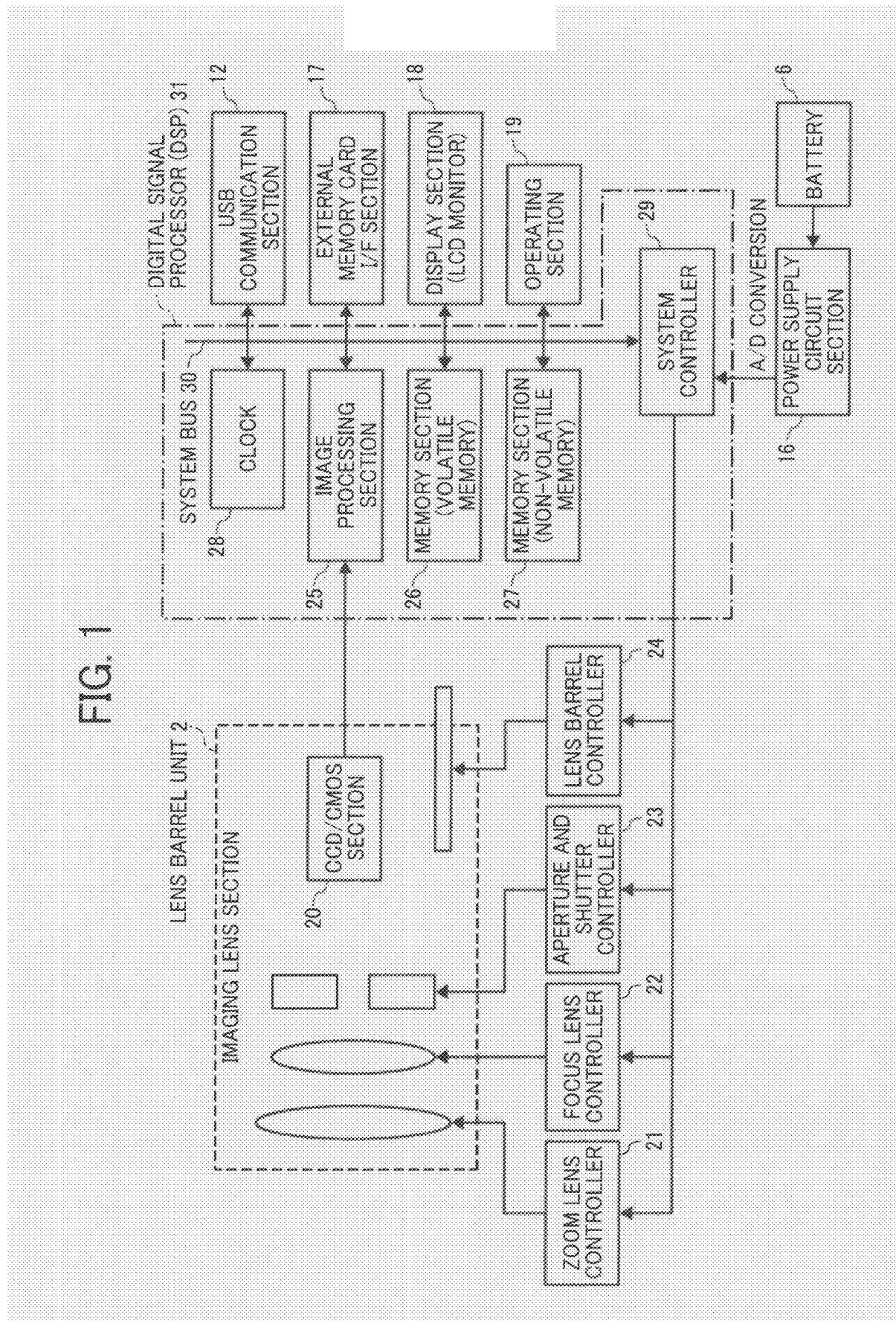
FIG. 1 is a block diagram illustrating a schematic structure of an imaging device according to Embodiment 1 of the present invention.
Figure 2A:
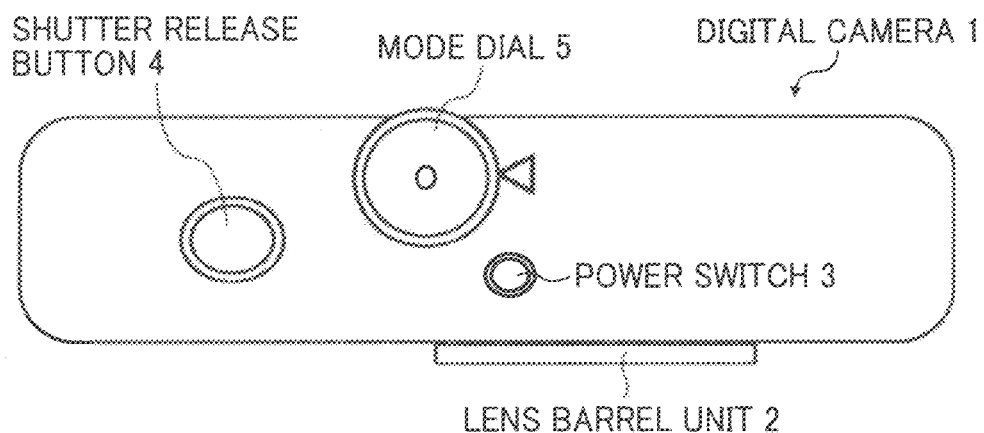
FIG. 2A is an external top view of the imaging device according to Embodiment 1, and illustrates a collapsed state of a lens barrel unit.
Figure 2B:
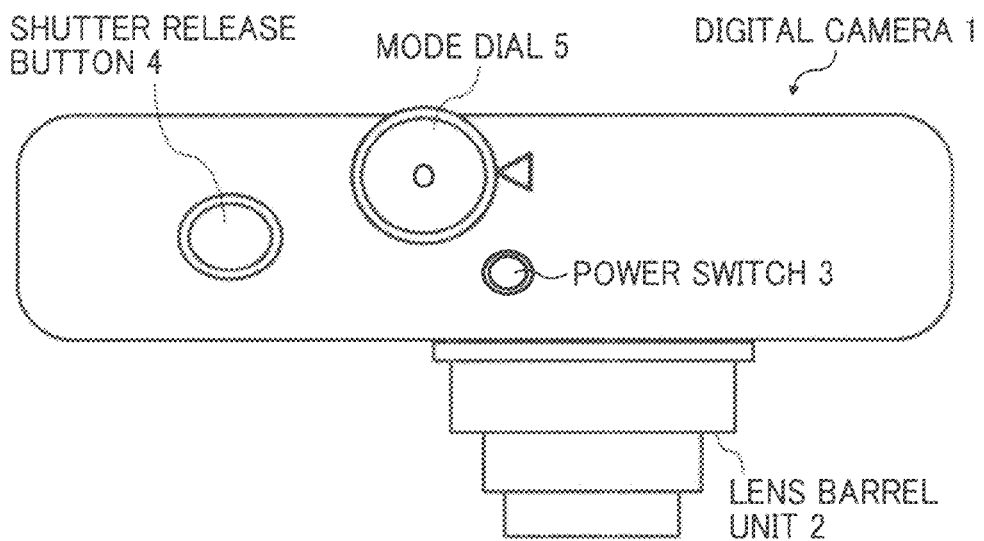
FIG. 2B is an external top view of the imaging device according to Embodiment 1, and illustrates an extended state of the lens barrel unit.
Figure 3:
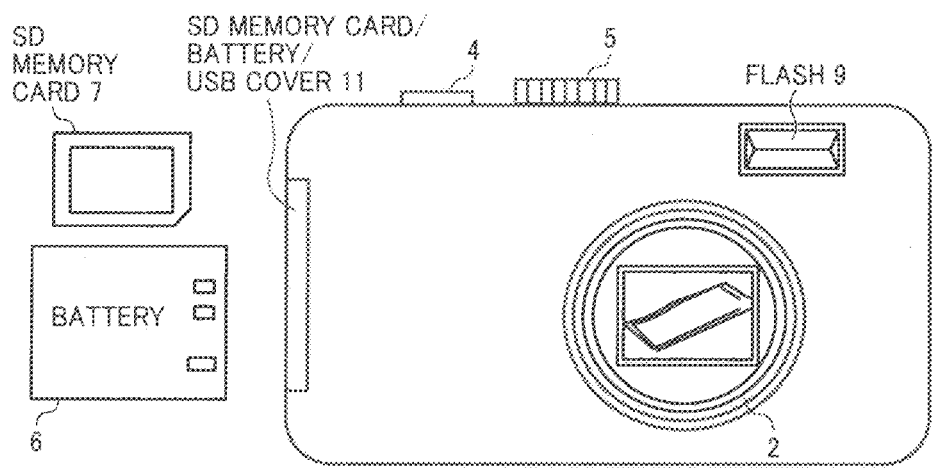
FIG. 3 is an external view of the imaging device according to Embodiment 1 seen from a photographic subject side.
Figure 4:
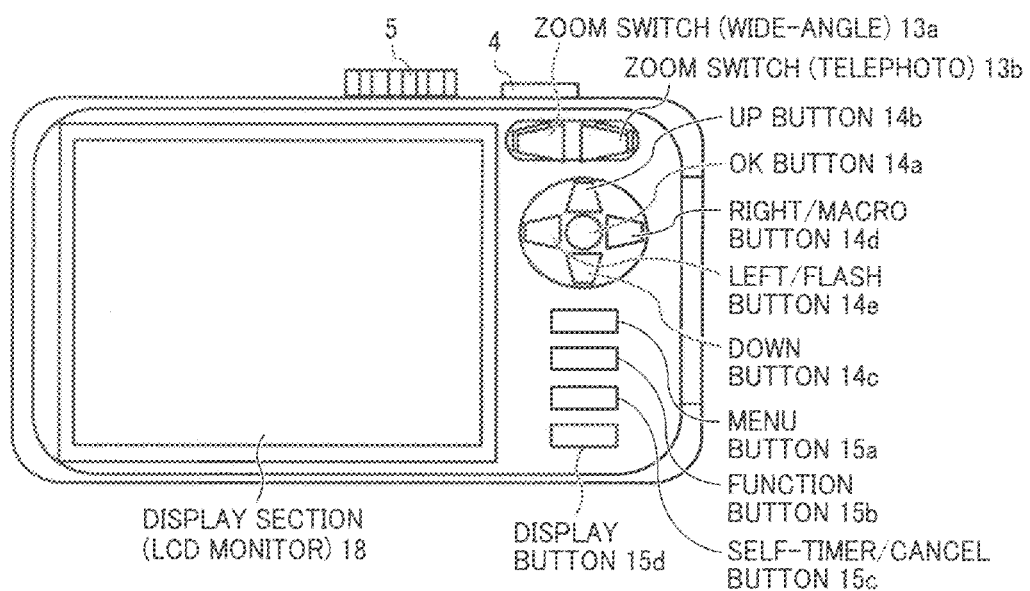
FIG. 4 is an external view of the imaging device according to Embodiment 1 seen from a photographer side.

FIG. 1 is a block diagram illustrating a schematic structure of an imaging device according to Embodiment 1 of the present invention. FIGS. 2A and 2B are external views of the imaging device (digital camera 1) seen from above according to Embodiment 1. FIG. 2A illustrates a collapsed state of a lens barrel unit 2 and FIG. 2B illustrates an extended state of the lens barrel unit 2. FIG. 3 is an external view of the imaging device (digital camera 1) seen from the front, that is, seen from a photographic subject side. FIG. 4 is an external view of the imaging device (digital camera 1) seen from the back, that is, seen from a photographer side.

As illustrated in FIG. 1, in the imaging device (digital camera 1), an imaging lens section (an optical system) in the lens barrel unit 2 includes a zoom lens, a focus lens, a mechanical shutter, and an aperture. Each of the zoom lens, the focus lens, the mechanical shutter, and the aperture is respectively controlled by a zoom lens controller 21, a focus lens controller 22, an aperture and shutter controller 23, and a lens barrel controller 24. Specifically, the zoom lens controller 21 implements a zoom function. The focus lens controller 22 has a function to perform a focusing operation on a photographic subject. The aperture and shutter controller 23 controls brightness of the photographic subject and performs a shutter control. The lens barrel controller 24 extends the lens barrel unit 2 when starting up and collapses the lens barrel unit 2.

The zoom lens and the focus lens are operated by a motor (not illustrated). FIG. 2A is an external view illustrating a state where the lens barrel unit 2 is collapsed, and FIG. 2B is an external view illustrating a state where the lens barrel unit 2 is extended. FIGS. 2A and 2B are views of the digital camera 1 seen from above. On the top of the digital camera 1, a shutter release button 4, a mode dial 5, and a power switch 3 are arranged.

And FIG. 3 is an external view of the imaging device (digital camera 1) seen from a photographic subject side, and FIG. 4 is an external view of the imaging device (digital camera 1) seen from a photographer side.

The mode dial 5 provides an imaging mode, a playback mode which is for displaying an imaged image, a setup mode which is for setting various settings, a portrait mode which is for imaging a person, a night view mode which is for imaging a night view, and so on to a user. The user performs switching of each of the modes by the above mode dial 5.

In Embodiment 1, "a miniature faking photography mode" (an imaging mode which processes an imaged image to look as if a miniature scale model was imaged, and records the processed image) can be assigned to the mode dial 5 as well. For example, in the case where the mode dial 5 is set to the imaging mode, the lens barrel unit 2 is extended to a photographable position, and the digital camera 1 enters a monitoring (live-preview) state.

The monitoring state is a state where a user who performs a shooting sees a photographic subject on a display section (LCD monitor) 18 illustrated in FIG. 4 in real time. In this state, a shutter is in an open state, and an image formed by light received through the focus lens and the zoom lens is converted to an electric signal by a CCD (charge-coupled device) or a CMOS (complementary metal-oxide semiconductor), each of which is an image sensor, of a CCD/CMOS section 20, and then transfers to an image processing section 25 as image data. An image expressed by the image data is displayed on the display section (LCD monitor) 18 in real time. Normally, an image of 640×480 pixels is transferred at 30 frames per second, and the user confirms the photographic subject in real time by the image displayed on the display section (LCD monitor) 18, and waits for a chance to press a shutter release button 4.

Most of the shutter release buttons are two-step type. The shutter release button 4 is a two-step shutter release button, and a state where the shutter release button 4 is half-pressed is defined as a first step, and a state where the shutter release button 4 is fully-pressed is defined as a second step. An autofocus (AF) operation is performed by the first step, that is, when the shutter release button 4 is half-pressed. In other words, at this time, focus is locked (focus lock is performed). The focus lock will be explained as follows.

When the shutter release button 4 is half-pressed (first step), an AF (autofocus) evaluation value and an AE (automatic exposure) evaluation value are calculated based on a YUV signal taken in the image processing section 25 from the CCD/CMOS section 20. The AF evaluation value expresses a degree of focus of the imaged image, and the AE evaluation value expresses an exposure state. Data of the AF evaluation value is read out to a system controller 29 as characteristic data and is used for an autofocus (AF) operation. In an in-focus state, an edge part of a photographic subject in an image is sharp, and accordingly, as to integral values of the AF evaluation value, a high-frequency component of the image becomes maximum. By use of the integral values of the AF evaluation value, an in-focus state detection is performed by calculating an AF evaluation value at each position of the focus lens, and detecting a point (peak position) where the AF evaluation value becomes maximum.

Additionally, in consideration of a case where there is a plurality of points where the AF evaluation value becomes maximum, in the case where there is the plurality of points where the AF evaluation value becomes maximum, magnitudes of AF evaluation values at peak positions, and degrees of rise and fall of values between the AF evaluation values at the peak positions and those in their vicinities are examined, and a most reliable point is taken as an in-focus position, and the AF operation is executed.

Figure 5:
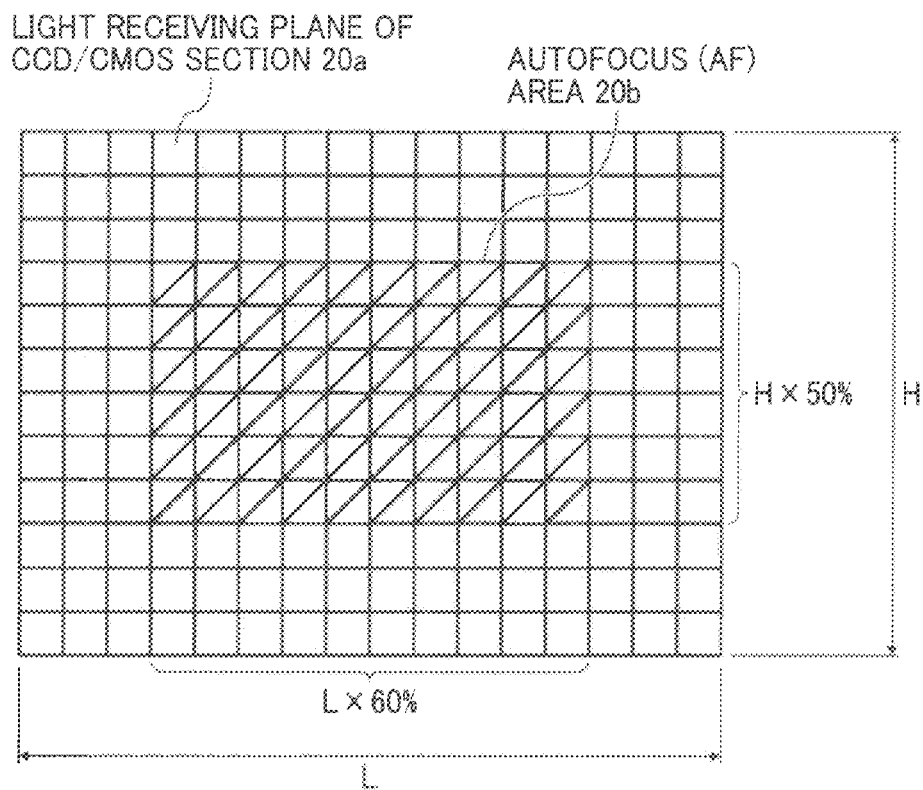
FIG. 5 is a diagram illustrating a light receiving plane and an AF (autofocus) area of the imaging device according to Embodiment 1.

The AF evaluation value is calculated from a specific range of a photographic subject image expressed by the imaged image data, that is, a specific range of a light receiving plane 20a of the CCD/CMOS section 20. A center frame in the display section 18 is an AF (autofocus) area of the digital camera 1. As illustrated in FIG. 5, an AF area 20b is 60% the size of that in a horizontal direction (L) and 50% the size of that in a vertical direction (H) of the light receiving plane 20a of the CCD/CMOS section 20.

Next, as to the AE evaluation value, the light receiving plane 20a of the CCD/CMOS section 20 is divided into areas (16 horizontal×16 vertical areas in this digital camera 1), which are not illustrated, and luminance data measured in the areas is used. As to each pixel in each divided area, a pixel of which the luminance value exceeds a predetermined threshold value is taken as a target pixel. The AE evaluation value is obtained such that the luminance value of the target pixel is added and multiplied by the number of target pixels. A proper exposure amount is calculated by luminance distribution of each divided area, and the calculation result is fed back to imaging of a next image.

Figure 6:
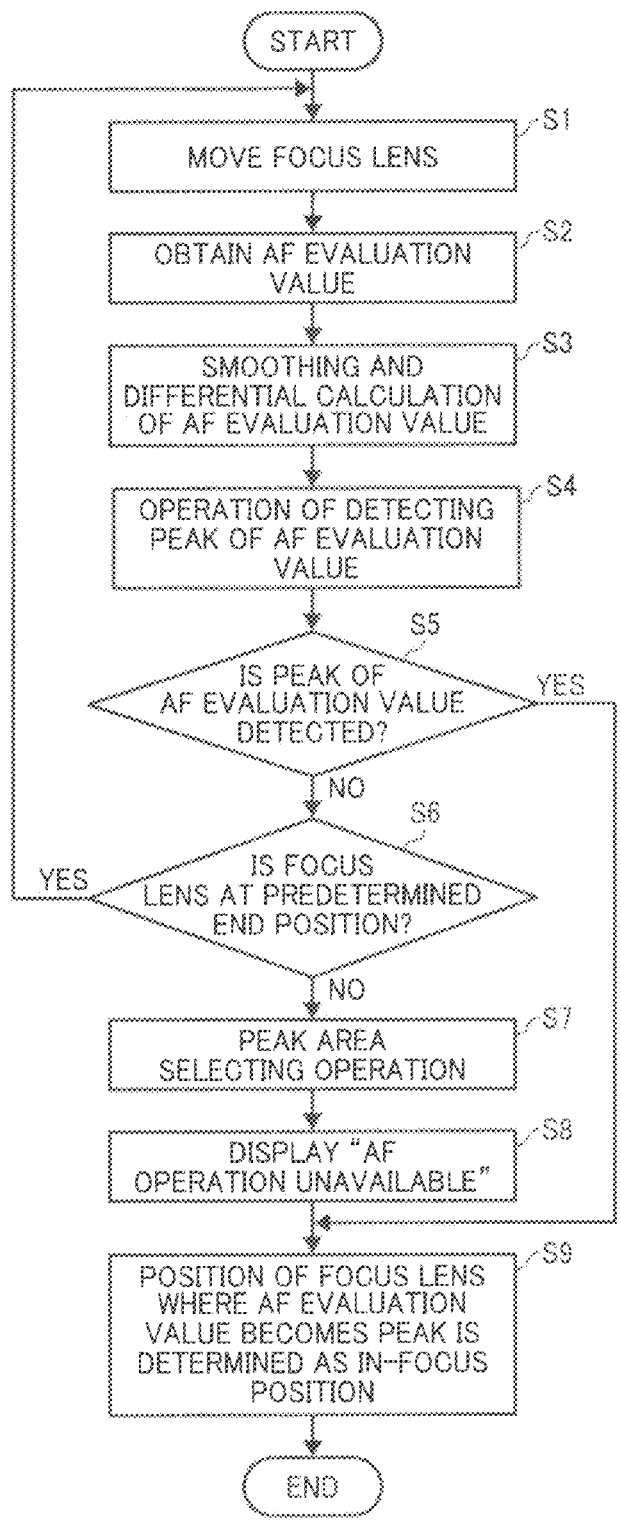
FIG. 6 is a flowchart illustrating a basic action of an AF operation.

A basic action of the AF operation is performed based on a flowchart of FIG. 6.

The focus lens is moved by only a predetermined pulse amount (step S1), and then the AF evaluation value is obtained based on data of an AF area (step S2). By results obtained from a smoothing and differential calculation of the AF evaluation value (step S3), a detecting operation of a peak of the AF evaluation value (step S4) and so on, whether the peak of the AF evaluation value is detected or not is confirmed (step S5). In the case where the peak is detected (YES of step S5), a position of the focus lens where the AF evaluation value becomes the peak is determined as the in-focus position (step S9), and then the operation ends. In the case where the peak is not detected (NO of step S5), whether the focus lens is at a predetermined end position of movement of the focus lens or not is confirmed (step S6). In the case where the focus lens is not at the predetermined end position (NO of step S6), the focus lens is moved again until the focus lens is at the predetermined end position, and a calculation of the AF evaluation value is repeatedly performed, and when the peak is detected, the operation ends.

In the case where the focus lens is moved to the predetermined end position and the peak is not detected (NO of step S6), that is, in the case where focus is not determined from a closest distance to infinity, a peak area selecting operation is performed (step S7).

In the case where AF evaluation values in the closest distance side are large and AF evaluation values in the side of the middle and long distance to infinity are small, it is determined that the photographic subject is too close and the AF operation is unable to be performed, and an indication of "AF operation unavailable" is displayed on the display section 18 (step S8), and the operation ends.

Figure 7:
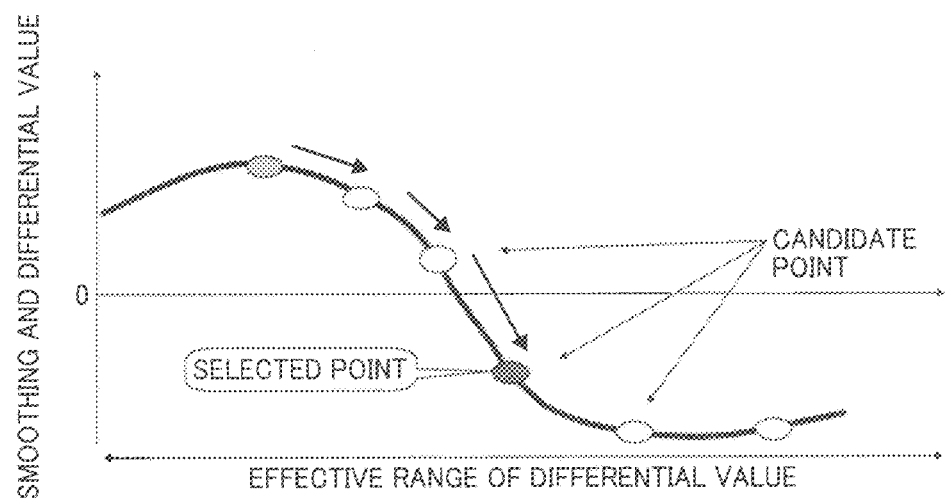
FIG. 7 is an explanatory diagram of a smoothing and differential technique used in a detecting operation of a peak of an AF evaluation value.

As a method of detecting the peak of the AF evaluation value, a smoothing and differential technique is used. A point where a value of the AF evaluation value becomes a negative value from 0 (zero) is taken as the peak of the AF evaluation value (see FIG. 7).

Regarding the AF operation, there are types of a one-shot AF, a moving object tracking AF, and so on. In the one-shot AF, the photographic subject is focused by the above-described first step. In the moving object tracking AF, for example, a face of a photographic subject is detected, and the detected face is brought into focus, and then if the detected face is moved, the detected face is continuously focused. The moving object tracking AF is that in which a moving object is tracked and focused continuously.

Figure 8A:
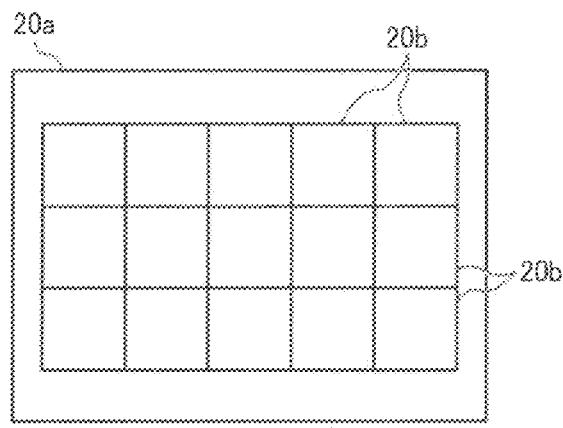
FIG. 8A is a diagram illustrating an example of an AF area which is divided into 15 divisional areas in the imaging device according to Embodiment 1.
Figure 8B:
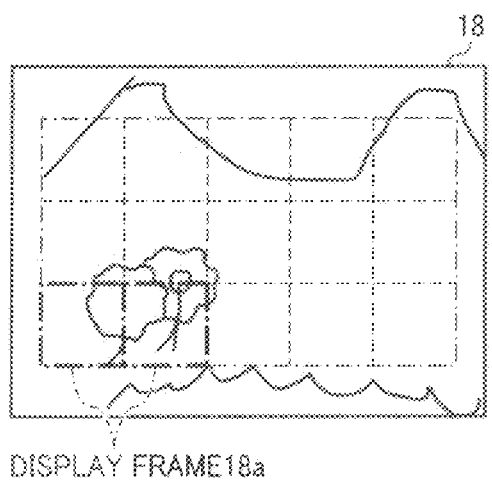
FIG. 8B is a diagram illustrating an example of a display frame which is in-focus in the imaging device according to Embodiment 1.
Figure 8C:
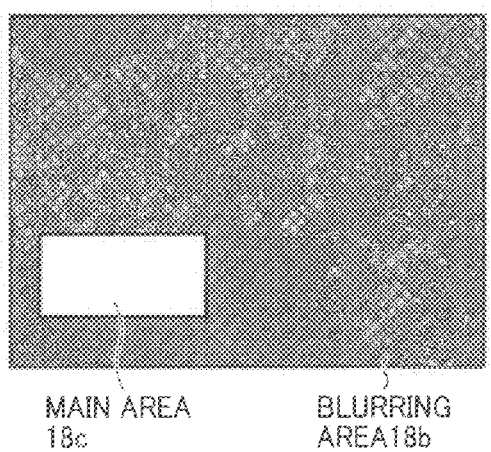
FIG. 8C is a diagram illustrating an example of a main area and a blurring area in the imaging device according to Embodiment 1.

FIGS. 8A to 8C illustrate examples of a multi-area AF. In the example illustrated in FIG. 5, the AF area is one area; however, in an example of the multi-area AF, as illustrated in FIG. 8A, an AF area 20b includes 15 divided areas, and the peak is detected in each divided AF area 20b. A case where equal to or more than two peaks are detected in adjacent divided areas is taken to be focused. In order to inform a user of being focused, a display frame 18a illustrated by a chain line in FIG. 8B is displayed on the display section 18, and an alarm sound informing of being focused goes off.

As to ordinary digital cameras, the power is supplied from batteries for exclusive use, AA batteries, and so on, and a suitable voltage is supplied to each block from a power supply circuit section 16 illustrated in FIG. 1 such as a DC-DC converter. The image processing section 25 performs various types of image processing on the image data. When the second step is performed (the shutter release button 4 is fully-pressed), an imaged image is transferred to the image processing section 25.

Additionally, in the image processing section 25, the imaged image (RGB data) is converted to YUV data (Y: luminance data; U and V: color difference data). And the image processing section 25 has a compressing and extending function that compresses YUV data in a JPEG-compliant compression format and extends compressed image data, and an image processing function that performs a blurring operation on a specified area.

Memory sections (volatile memory and non-volatile memory) 26 and 27 of SDRAM, flash memory and the like, an external memory I/F (interface) section 17, the system controller 29, a USB communication section 12, the display section 18, and a clock 28 are connected to each other by a system bus 30.

Conditions when imaging and a name of a digital camera are added to the compressed image data as a header of JPEG data to be an Exif-compliant file format of digital cameras, and then the image data to which the header has been added is temporarily stored in the memory section (volatile memory:

SDRAM) 26 as a JPEG file. The external memory card I/F section 17 is provided so that an external memory card is detachable, and the above JPEG file is stored in the external memory card. As the external memory card, there are several kinds such as a CompactFlash (registered trademark), an SD memory card 7, and so on.

A digital signal processor (DSP) 31 includes the image processing section 25, the memory sections 26 and 27, the clock 28, and the system controller 29.

Embodiment 1

Figure 9:
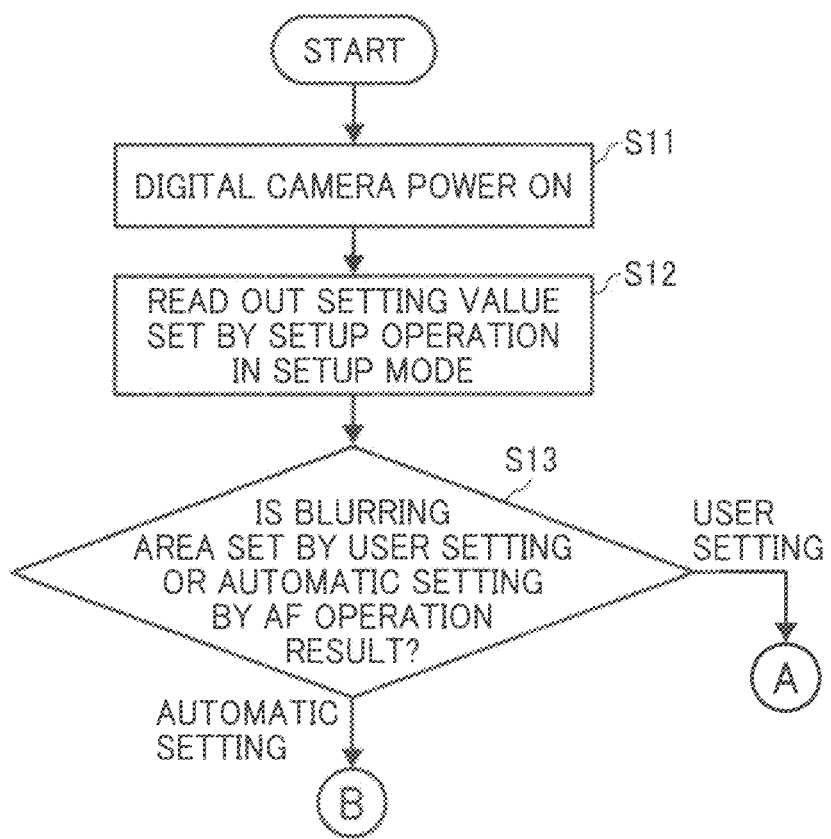
FIG. 9 is a flowchart explaining a selecting operation of a blurring area setting operation of the imaging device according to Embodiment 1.
Figure 10:
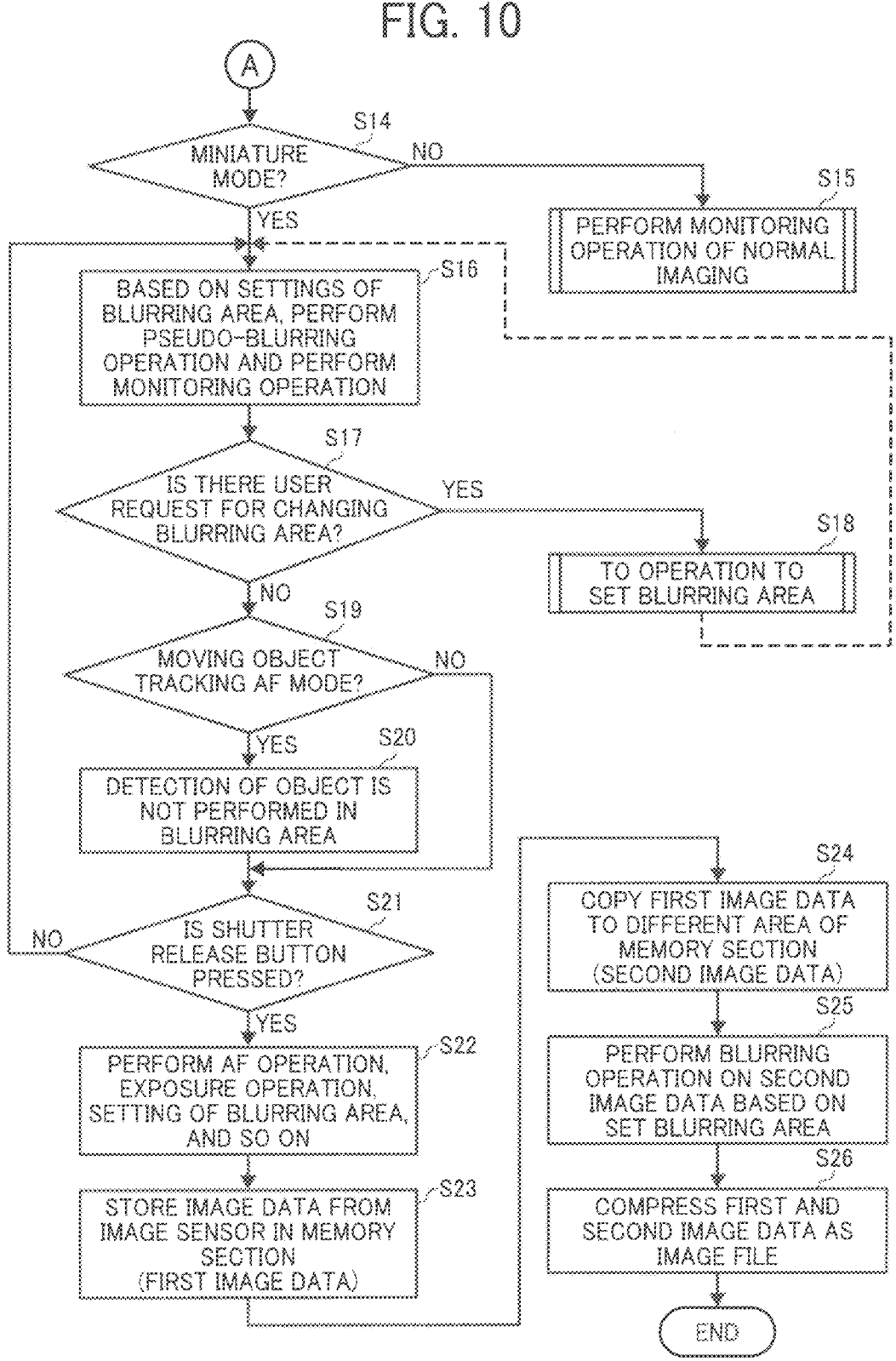
FIG. 10 is a flowchart explaining a blurring area setting operation by a user setting of the imaging device according to Embodiment 1.

FIGS. 9 and 10 are flowcharts explaining operations of the imaging device according to Embodiment 1. In particular, FIG. 9 is a flowchart explaining a selecting operation of a blurring area setting operation, and FIG. 10 is a flowchart explaining a blurring area operation by a user setting.

In accordance with FIGS. 9 and 10, the operations of the imaging device according to embodiment 1 will be explained with reference to FIGS. 1 to 8.

As illustrated in FIG. 9, the power of the digital camera 1 is ON (step S11). Firstly, an operation program is operated in the system controller 29 and reading of settings performed in a setup operation of the setup mode is performed (step S12). Contents of the settings are stored in the memory section (non-volatile memory) 27, and the contents are not lost when the power is turned OFF.

In Embodiment 1, for example, as the contents of the settings for performing "a miniature faking photography", whether "setting a blurring area by a user (user setting)" or "setting automatically a blurring area based on an AF operation result (automatic setting)" is set by a user is confirmed (step S13). In the case of "the user setting" in step S13, the operation moves to the operation of the flowchart illustrated in FIG. 10. And in the case of "the automatic setting" in step S13, the operation moves to an operation of a flowchart illustrated in FIG. 14.

In the setup operation of the setup mode, by use of a menu button 15*a*, up, down, right, and left buttons 14*b* to 14*e* as the operating section 19 illustrated in FIG. 4, the user sets the settings whilst looking at the display section (LCD monitor) 18. The settings set by the user here are stored in the memory section (non-volatile memory) 27.

Next, in the case of "the user setting" in step S13 of FIG. 9, as illustrated in the flowchart of FIG. 10, whether the mode setting is "the miniature faking photography" (hereinafter, it is referred to as "a miniature mode") or not is confirmed (step S14). Whether the mode setting is the miniature mode or not is confirmable based on the settings of the mode dial 5.

In the case where the mode setting is not the miniature mode (NO of step S14), a monitoring operation in a normal imaging is performed (step S15). On the other hand, in the case where the mode setting is the miniature mode (YES of step S14), based on the settings of the blurring area set by the user, a pseudo-blurring operation is performed, and then the monitoring operation is performed (step S16). Additionally, when the first step is performed, the AF operation is executed.

Figure 11A:
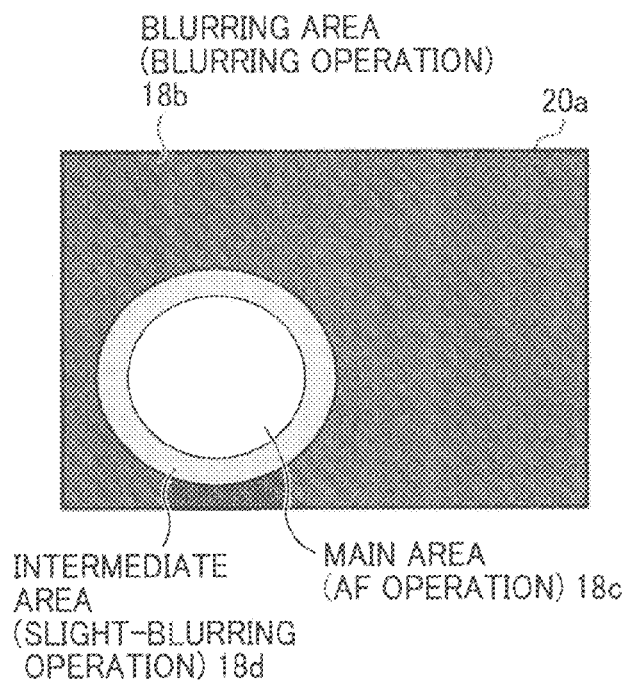
FIG. 11A illustrates an example of setting of the main area in a round shape according to Embodiment 1.

An example of the blurring area set by the user is illustrated in FIG. 11A. In FIG. 11A, a main area 18*c* where the blurring operation is not performed is set at the lower left. An intermediate area 18*d* where a slight-blurring operation is performed is set in the vicinity of the main area 18*c*. A blurring area 18*b* where the blurring operation is performed is set for an area other than the main area 18*c* and the intermediate area 18*b*.

Figure 11B:
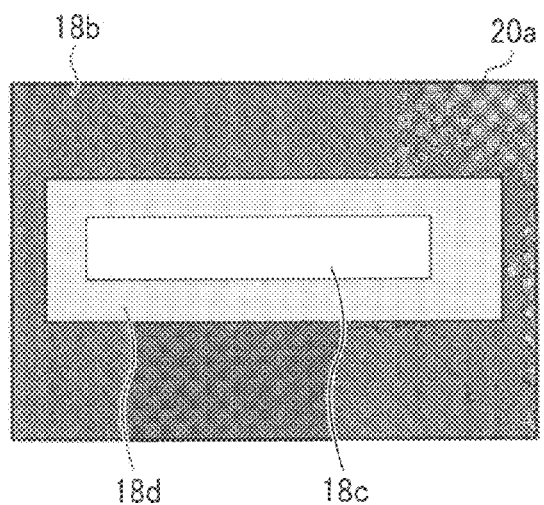
FIG. 11B illustrates an example of setting of the main area in a rectangular shape according to Embodiment 1.

In FIG. 11B, the main area 18*c* illustrated by a rectangular shape where the blurring operation is not performed, the intermediate area 18*d* where the blurring operation is slightly performed, and the blurring area 18*b* where the blurring operation is performed are set.

In the case of performing the pseudo-blurring operation on an image when monitoring, to help the user understand easily, an OSD (on-screen display) can be displayed on the display section 18. For example, in particular, the main area 18*c* is displayed as transmittance of 100%, and the blurring area 18*b* is displayed as transmittance of 50%. Therefore, without actually performing the blurring operation on monitoring image data, it is possible for the user to recognize the set blurring area 18*b* while monitoring and perform imaging.

In the case where there is a user request to change the blurring area 18*b* when monitoring (step S17), and when the above user request is confirmed (YES of step S17), the operation moves to an operation to set the blurring area 18*b* (step S18). Pressing a display button 15*d* of FIG. 4 is a trigger of the operation to set the blurring area 18*b*, and when the user presses the display button 15*d*, a setting screen of a main area and blurring area as illustrated in FIGS. 12A to 12D is displayed. In the case of setting a main area in a rectangular shape such as FIGS. 12A and 12B, the main area 18*c* is moved up and down by an up-and-down key (an operation of an up button 14*b* and a down button 14*c*). A width of the main areas 18*c* is changed by a right-and-left key (an operation of a left/flash button 14*e* and a right/micro button 14*d*).

Figure 12A:
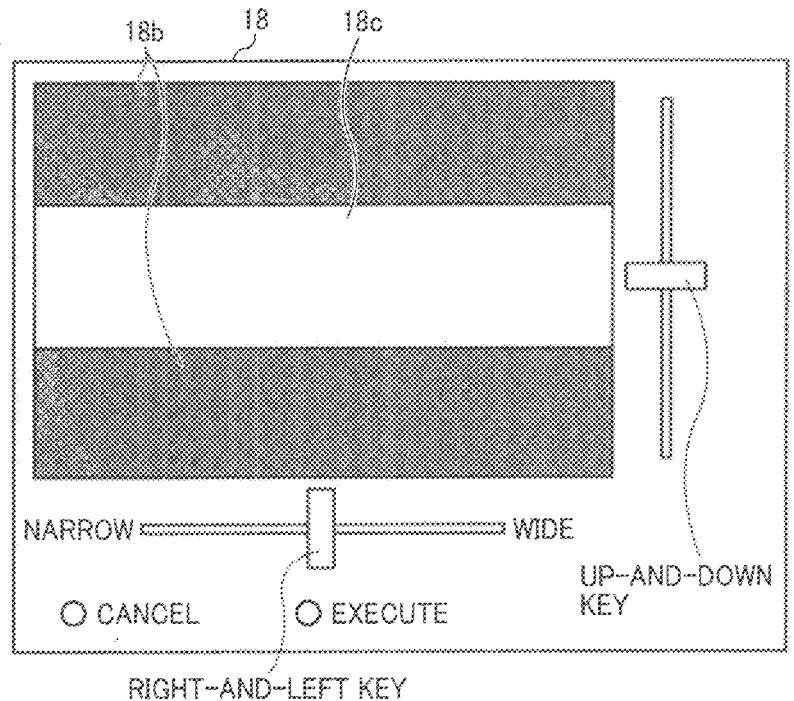
FIG. 12A illustrates an example of a screen for setting main and blurring areas in rectangular shapes according to Embodiment 1.
Figure 12B:
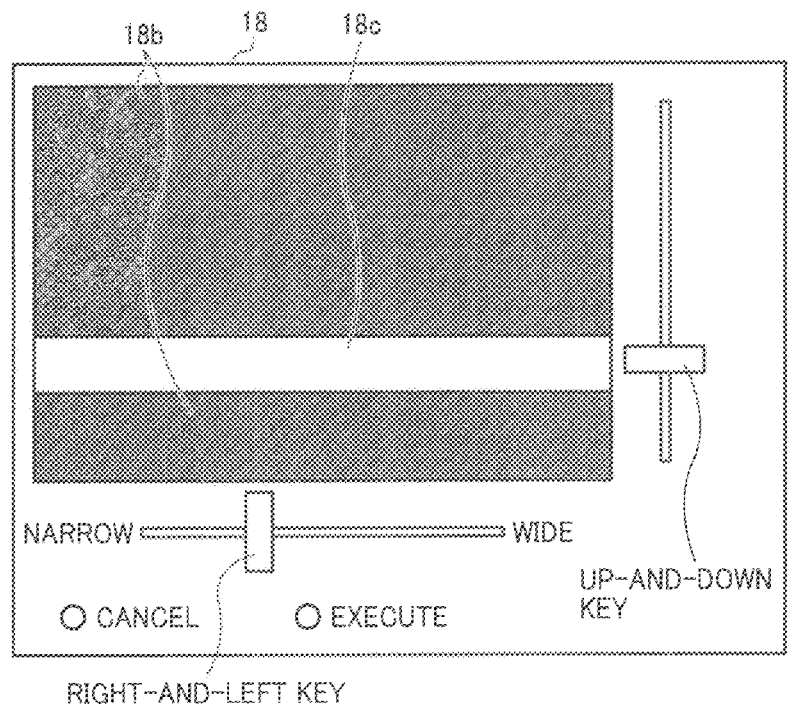
FIG. 12B illustrates another example of a screen for setting main and blurring areas in rectangular shapes according to Embodiment 1
Figure 12C:
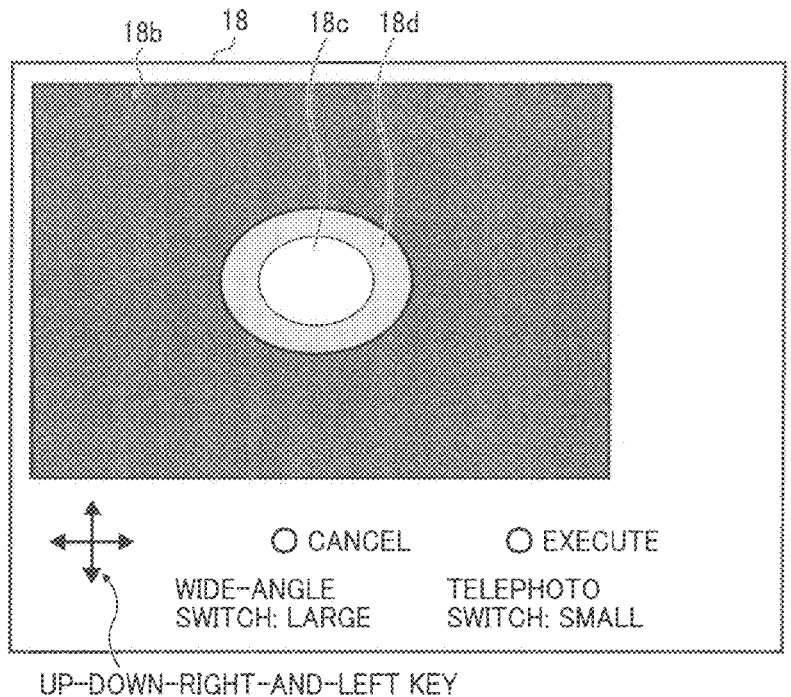
FIG. 12C illustrates an example of a screen for setting main and blurring areas in round shapes according to Embodiment 1.
Figure 12D:
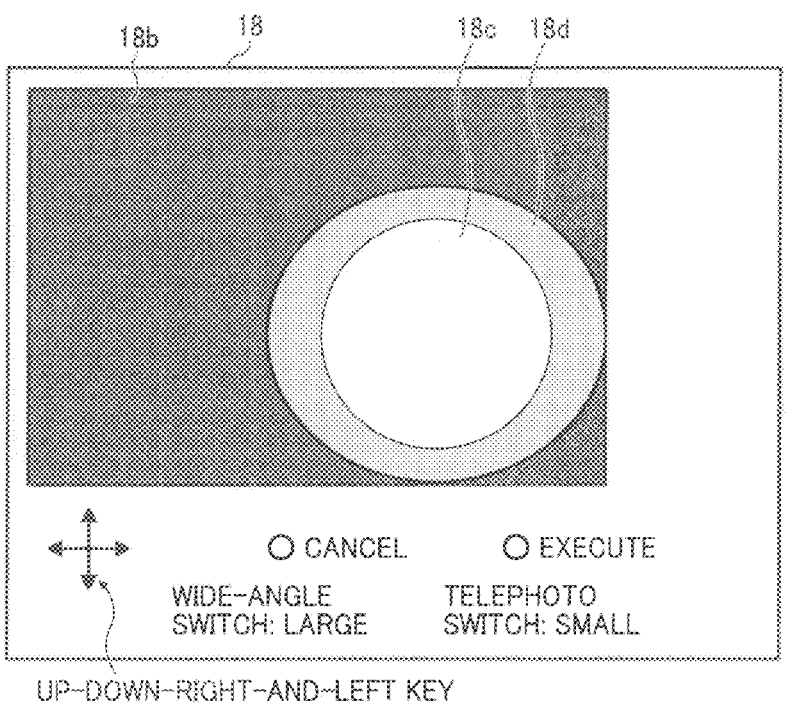
FIG. 12D illustrates another example of a screen for setting main and blurring areas in round shapes according to Embodiment 1.

In the case of setting a main area in a round shape such as FIGS. 12C and 12D, the main area 18*c* is moved by an up-down-right-and-left key (an operation of the buttons 14*b* to 14*e*), and becomes larger by an operation of a zoom switch (wide-angle) 13*a*, and becomes smaller by an operation of a zoom switch (telephoto) 13*b*.

When the blurring area 18*b* is changed in step S18, the operation returns to step S16, and based on the changed blurring area, the pseudo-blurring operation is performed and then the monitoring operation is performed.

Figure 13A:
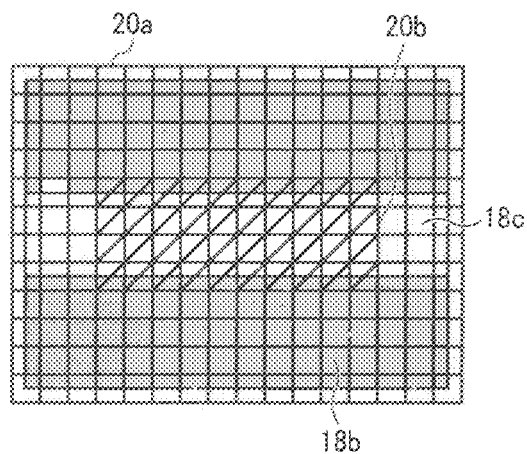
FIG. 13A is a diagram illustrating a relationship between a blurring area and a main area.
Figure 13B:
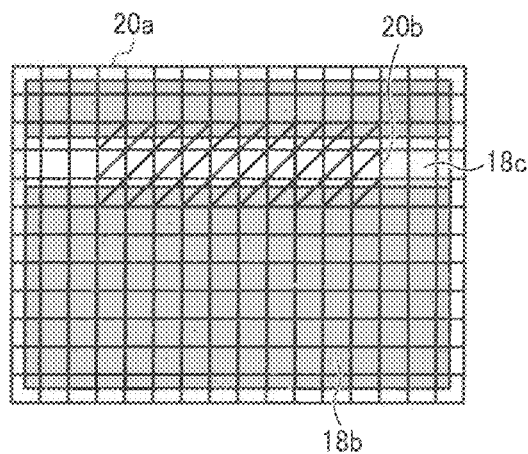
FIG. 13B is another diagram illustrating a relationship between a blurring area and a main area.
Figure 13C:
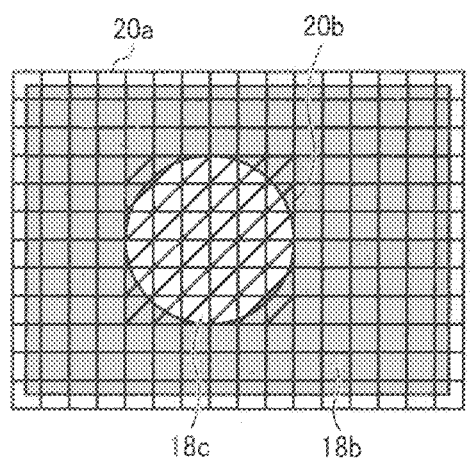
FIG. 13C is another diagram illustrating a relationship between a blurring area and a main area.
Figure 13D:
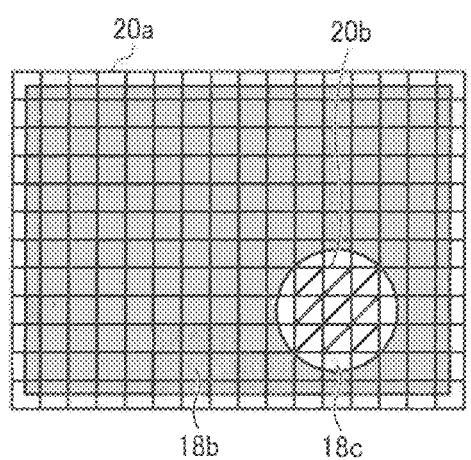
FIG. 13D is another diagram illustrating a relationship between a blurring area and a main area.

Thus, the main area 18*c* and the blurring area 18*b* are settable by the user. At this time, when the first step is performed, the AF operation is performed. An AF area where the AF operation is performed is set based on the main area 18*c* set by the user. Examples of a relationship between the main area 18*c* and the AF area 20*b* are illustrated in FIGS. 13A to 13D. In the case of FIG. 13B, a width of the main area 18*c* in a vertical direction of FIG. 13B is narrow, and a center line in a longitudinal direction is set in a top part of the light receiving plane 20*a* of the CCD/CMOS section 20. In this case, the AF area 20*b* is also set as well as the main area 18*c*. A width of the AF area 20*b* in the vertical direction of FIG. 13B is narrow, and a center line in the longitudinal direction is set in the top part of the light receiving plane 20*a* of the CCD/CMOS section 20. In this case, the AF area is narrower than that in the case where the blurring operation is not performed (see FIG. 5), therefore a speed of the AF operation is fast.

In addition, whether the digital camera 1 is in a moving object tracking AF mode or not is confirmed (step S19). Here, in the case of the moving object tracking AF mode when monitoring (YES of step S19), for example, in the case of a face detection AF mode, whether there is a face or not in a monitoring image when monitoring is detected. Once a face is detected, a motion of the detected face is tracked and the AF operation is always performed on the detected face as an object when monitoring. In the case where the blurring operation is not performed, an area where a face detection is performed is the AF area, however in the case where the blurring area is set as illustrated in FIG. 13A and the blurring operation is performed, the face detection is performed on the main area 18*c*, and therefore a speed of the face detection is fast. Additionally, in the case where the face moves outside the main area 18c, the face detection is stopped (step S20).

A face tracking described above is performed based on an optical flow calculated based on differences between a plurality of photographic subject images.

As well as the AF operation, exposure control is also performed by the aperture and shutter controller 23 illustrated in FIG. 1, and the aperture and shutter controller 23 controls exposure to be adjusted mainly in the main area.

Whether the shutter release button 4 is pressed (second step) or not is confirmed (step S21). In the case where the second step is not performed (NO of step S21), the operation returns to step S16, and the monitoring operation is repeated. In the case where the second step is performed (YES of step S21), the AF operation, an exposure operation, setting of the blurring area, and so on are performed (step S22). The shutter control is performed, and data of the imaged image is transferred to the image processing section 25 from the CCD/CMOS section 20, and then stored in the memory section 26 (step S23). The image data stored in the memory section 26 is taken as first image data. And the first image data is copied into a different area of the memory section 26. The copied image data is taken as second image data.

The blurring operation is performed on a predetermined blurring area 18b set by the user of the second image data (step S25). And then, each of the first and second image data is compressed as an image file in JPEG format, and is stored on the SD memory card 7, for example (step S26).

In Embodiment 1, the main area is taken as the AF area. However, for example, in the case of the moving object tracking AF mode, when an object moves outside the main area, the AF operation is not performed. Therefore, there is no longer a chance of performing a wasted AF operation and exposure operation.

Embodiment 2

Figure 14:
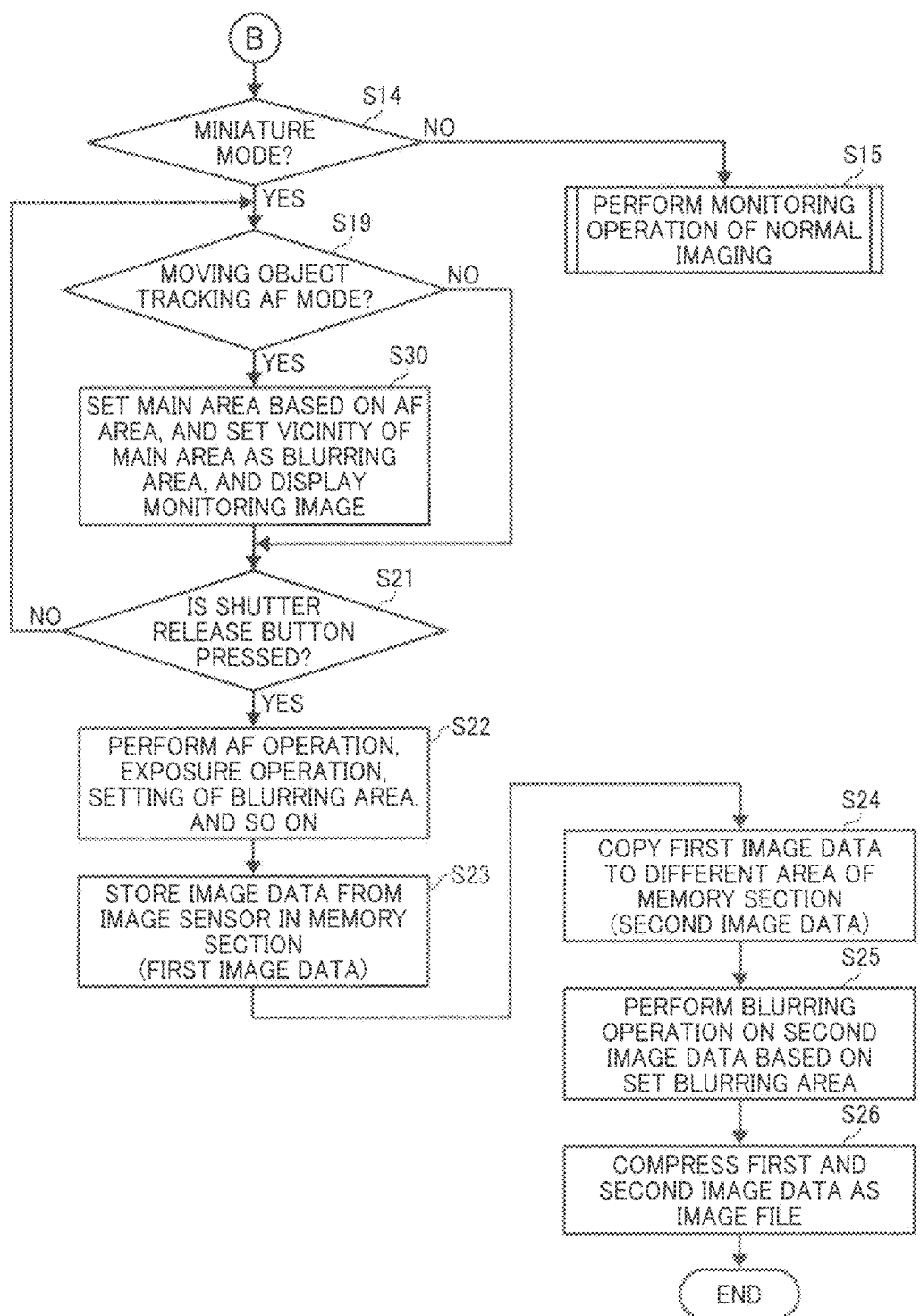
FIG. 14 is a flowchart explaining a blurring area setting operation by an automatic setting of an imaging device according to Embodiment 2 of the present invention.

FIG. 14 is a flowchart explaining an operation of the imaging device according to Embodiment 2 of the present invention. In particular, FIG. 14 is a flowchart explaining the blurring area setting operation by the automatic setting.

In accordance with FIG. 14, the operation of the imaging device according to Embodiment 2 of the present invention will be explained with reference to FIGS. 1 to 8. Here in FIG. 14, steps equivalent to the steps explained by FIG. 10 will be denoted by the same reference numerals.

In the case where setting of the blurring area is the automatic setting in step S13 illustrated in FIG. 9, as illustrated in the flowchart of FIG. 14, whether the mode setting is the miniature mode or not is confirmed (step S14). In the case of the miniature mode (YES of step S14), the first step is performed and the AF operation is executed. And a main area is automatically set based on an AF area where the AF operation is performed. For example, a centroid of the AF area and a centroid of the main area are set to be overlapped. And the blurring operation is performed in the vicinity of the main area as a blurring area. In this case, so as to be easily recognized by a user, in the case of the first step, the OSD (main area 18c) in a rectangular shape can be performed as illustrated in FIG. 8C. And additionally, in the case of a round shape, the OSD (main area 18c) can be performed as illustrated in FIG. 15B.

In Embodiment 2, the main area and blurring area are set automatically, therefore without performing the operation to set the blurring area (steps S16 to S18 illustrated in FIG. 10), whether the digital camera 1 is in the moving object tracking AF mode or not is confirmed (step S19). In the case of the moving object tracking AF mode (YES of step S19), in place of step S20 of FIG. 10, the main area is always set based on the AF area, and the vicinity of the main area is set as the blurring area, and then a monitoring image is displayed on the display section (LCD monitor) 18 as described later (step S30).

Figure 15A:
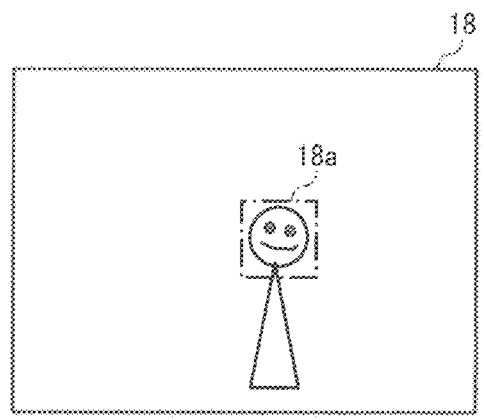
FIG. 15A is an example in the imaging device according to Embodiment 2 and a diagram illustrating a display frame for an object.
Figure 15A:
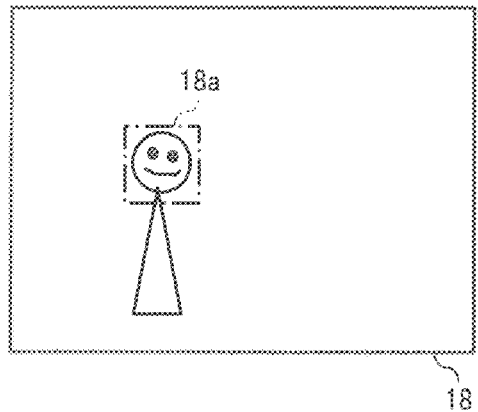
Figure 15B:
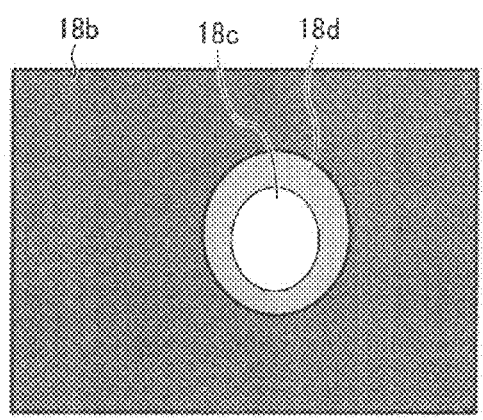
FIG. 15B is an example in the imaging device according to Embodiment 2 and a diagram illustrating a main area and a blurring area for the object.
Figure 15B:
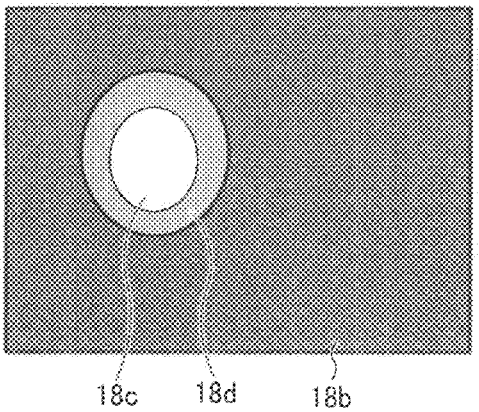

In the case where a face has been detected in the moving object tracking AF mode, when monitoring, by a display frame 18c illustrated by a chain line as illustrated in FIG. 15A, the OSD is performed to recognize the detected face. In the case of the miniature mode, as illustrated in FIG. 15B, a main area 18c and a blurring area 18b can be displayed in such a manner that transmittance of the main area 18c is 100%, and transmittance of the blurring area 18b is 50%.

The operation from step S21 is the same as Embodiment 1 (see FIGS. 10 and 14).

In addition, according to Embodiment 2, if a main area is at an arbitrary position in the light receiving plane 20a of the CCD/CMOS section 20, the main area is automatically set and a blurring area is set in the vicinity of the main area. Therefore, a task to set the main area is reduced.

The digital signal processor (DSP) 31 corresponds to an autofocus operation section, a main area setting section, a blurring operation section, an autofocus area setting section, a face detecting section, and a moving object tracking operation section.

The imaging device and imaging method according to the embodiments of the present invention apply to electronic devices such as a mobile phone, a personal digital assistant (PDA), a toy, and the like.

According to the embodiments of the present invention, it is possible to precisely obtain an effect of the miniature faking photography, because the blurring area is suitably set.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:
1. An imaging device, comprising:
an optical system which obtains an optical image of a photographic subject;
an image sensor which converts the optical image to an electric signal;
a display which displays a display image based on the electric signal;
a first user interface to specify on the display, using user input, at least one of a first area on which a blurring operation is to be performed and a second area on which the blurring operation is not performed;
a processor which performs the blurring operation by performing an image processing operation such that the first area is blurred;
an autofocus device which focuses automatically in an autofocus area which is rectangular and different from the second area; and
a second user interface to instruct execution of an autofocus operation by the autofocus device,
wherein:
the display displays a live view of image data corresponding to the first area that is displayed in a blurred state and the second area,
the second area is a rectangle including four sides, two of the sides of the rectangle opposite to each other being longer than another two of the sides of the rectangle which are also opposite to each other, a length of at least one of the sides of the autofocus area is shorter than the longer sides of the second area, the autofocus area overlaps with at least a part of the second area, and the autofocus device performs the autofocus operation in the autofocus area, when the second user interface is activated.

2. The imaging device according to claim 1, further comprising:

an autofocus area setting section which sets the autofocus area.

3. The imaging device according to claim 1, further comprising:

a face detecting section which detects a face in the photographic subject image, the face which has been detected being set as the second area.

4. The imaging device according to claim 1, wherein the autofocus device further includes:

a moving object tracking operation section which tracks a motion of an object and sets the autofocus area on the object.

5. The imaging device according to claim 1, wherein the autofocus area is displayed on the display.

6. The imaging device according to claim 1, wherein:

when the display displays the live view, the display displays the first area with a reduced transmittance.

7. The imaging device according to claim 1, wherein:

the displayed live view is a miniature fake of the image data which appears to be a miniature model.

8. A method, comprising:

setting, by a user using a first user interface, at least one of a first area on a display for which a blurring operation on corresponding image data is to be performed and a second area on the display on which the blurring operation on image data corresponding thereto is not performed;

performing an autofocus detection in an autofocus area that at least partly overlaps with the second area, in response to operation of a second user interface to instruct execution on an autofocus operation, the auto focus area being rectangular and different from the second area;

obtaining an image through an optical system of an image including the first area and the second area;

performing an image processing operation that blurs image data corresponding to the first area; and displaying a live view corresponding to the image obtained through the optical system, the live view including a display corresponding to the first area that is displayed in a blurred state and corresponding to the second area, wherein:

the second area is a rectangle including four sides, two of the sides of the rectangle opposite to each other being longer than another two of the sides of the rectangle which are also opposite to each other, a length of at least one of the sides of the autofocus area is shorter than the longer sides of the second area, the autofocus area overlaps with at least a part of the second area, and the performing of the autofocus detection performs the autofocus detection in the autofocus area, when the second user interface is activated.

9. The method of claim 8, further comprising:

manually setting the autofocus area.

10. The method of claim 8, further comprising:

detecting a face within the image obtained through the optical system, wherein the detected face is in the second area.

11. The method of claim 8, further comprising:

tracking a moving object within the image obtained through the optical system, wherein the moving object is in the second area.

12. The method of claim 8, wherein the displaying comprises:

displaying the live view with the first area displayed with a reduced transmittance.

13. The method of claim 8, wherein:

the displaying of the live view displays a miniature fake of the image data which appears to be a miniature model.

* * * * *